United States Patent [19]

Franks et al.

[11] Patent Number: 4,879,751

[45] Date of Patent: Nov. 7, 1989

[54] AUDIO PRODUCTION CONSOLE

[75] Inventors: Nicholas Franks, Wilmslow; Graham A. Langley, Knutsford, both of England

[73] Assignee: Amek Systems & Controls Limited, Salford, England

[21] Appl. No.: 65,877

[22] Filed: Jun. 24, 1987

[30] Foreign Application Priority Data

Jun. 27, 1986 [GB] United Kingdom ................ 8615758
Nov. 13, 1986 [GB] United Kingdom ................ 8627191

[51] Int. Cl.[4] ................................ H04B 1/00

[52] U.S. Cl. ................................ 381/119; 381/81; 381/109; 381/123

[58] Field of Search .................. 381/119, 123, 80, 81; 84/345; 364/514; 369/1-4, 83; 360/13; 340/825.24, 825.25

[56] References Cited

U.S. PATENT DOCUMENTS

| | | | |
|---|---|---|---|
| 3,932,886 | 1/1976 | Olms et al. | 360/13 |
| 4,185,531 | 1/1980 | Oberheim et al. | 84/1.24 |
| 4,187,544 | 2/1980 | Larner | 364/514 |
| 4,260,854 | 4/1981 | Kolodny et al. | 381/81 |
| 4,292,467 | 9/1981 | Olden et al. | 381/1 |
| 4,479,240 | 10/1984 | McKinley, Jr. | 381/119 |
| 4,635,288 | 1/1987 | Stadius | 381/119 |
| 4,677,674 | 6/1987 | Snyder | 381/119 |

FOREIGN PATENT DOCUMENTS

| | | | |
|---|---|---|---|
| 2073994 | 10/1981 | United Kingdom | 340/825.24 |
| 2140248 | 11/1984 | United Kingdom | 381/119 |

OTHER PUBLICATIONS

Richards et al., "An Experimental All-Digital Studio Mixing Desk," J. Audio Eng. Soc., vol. 30, No. 3, Mar. 1982, pp. 117-126.

*Primary Examiner*—Donald J. Yusko
*Assistant Examiner*—Edwin C. Holloway, III
*Attorney, Agent, or Firm*—Dennison, Meserole, Pollack & Scheiner

[57] ABSTRACT

An audio production console has a plurality of input modules connected between an input and a common output bus. The modules are identical, and contain a plurality of circuits for carrying out functions on a signal from the corresponding input. A central control unit is connected to each of the modules and controls selected circuits of the units, to control the operation of the module. In this way the functions carried out by the modules are freely selectable, and hence the switching of circuits within each module may be simplified. This enables the normal separate monitor section of an audio production console to be omitted from each module, simplifying the module and the operation of the console as a whole.

12 Claims, 8 Drawing Sheets

AUDIO PRODUCTION CONSOLE

FIELD OF THE INVENTION

BACKGROUND OF THE INVENTION AND SUMMARY OF THE PRIOR ART

This invention concerns an audio production console.

Traditionally, sound recording was based on a combination of excellence of microphone placement techniques used to capture performances, and faithful registration on tape of the signals received. Nowadays, however, many recordings are principally assembled from a wide range of exactly-repeatable signals produced from a variety of non-performing programmable machinery such as synthesizers, sampling devices, and digital sound effects units.

The traditional technique was a two-stage process of recording signals onto multitrack tape and then remixing to stereo, adding sound effects processing during mixdown. Effectively, the final result was obtained only towards the end of the recording process. Consoles incorporated elaborate monitoring facilities which constituted a 'mixer within the mixer', allowing submixes to be created to guide the engineer and the musicians as the tracks were filled. Once the tape was full, the monitor mix was largely forgotten and the 'real' mixing began. Developments in computer techniques allowed a degree of mixing to precede and assist the actual mixdown process.

In recent times, four main tendencies have become apparent in the studio, namely the use of a larger number of tracks — 48 and heading for 64; the use of synthesizers and drum machines with multiple outputs; the use of very large quantities of external signal processing equipment; and the abandonment of the monitoring system provided with the console as being unsuitable for what might be called 'virtual mixing' recording techniques.

The essence of 'virtual mixing' is that the producer and engineer attempt to work from the onset with the sounds and sound sources that will be used in the final mix. As the recording process continues the layers of effects increase and must be exactly repeated with each pass of the tape. Overdubs are made not within the context of raw microphone signals replayed from tape but as part of the overall conceptualization of the piece of music, and must be accompanied therefore by the finished product at whatever stage it has reached. The engineer, producer and musicians all need to hear identical signals. The end result is that there is no longer any significant division between the 'monitor' mix and the 'Stereo' mix. The target has always been the stereo mix and the present-day approach to it is to 'mix as you go', i.e. to create the end product from the commencement of recording.

The addition of more inputs to a console makes it wider and in the past this has lead to ergonomic and operational problems, since the console has become excessively long and unwieldy. Moreover, with the extensive features now required on production consoles, conventional designs have become increasingly complex and confusing owing to the sheer density of controls. Many switch functions are virtually unused from day to day, or are 'presets' which when set up are not touched during operation. Furthermore, as the switches are electro-mechanical devices, they inevitably suffer from wear and tear, which decreases reliability.

The introduction of computer-assisted mixing has given the engineer critical control over both levels and mutes, and the use of timecode-based synchronization has allowed memorized events to be repeated in sequence with multiples of audio and video recorders locked together. As mixing is often interrupted by time constraints on studio availability, a need has become apparent to include memorization of control settings in the computer system to allow engineers and producers to return to the point where they had left off at the previous close of work. To date, however, although the development of recall systems for console potentiometer and individual channel configuration has made a step towards repeatability, this is only through relatively slow manual reloading of the memorised position using elaborate graphics-based prompts.

In prior art consoles, inputs were divided into monitory inputs and mixing inputs each associated with an input module. Those modules each carried out functions on a signal received at the corresponding input, such as fading, filtering, etc., controlled by electronic circuits within the module. The activation of those circuits was controlled by switches in the module, normally adjacent the adjustable control for that circuit. Furthermore, each module had a separate monitoring section, for use when the corresponding input was to be a monitoring input.

SUMMARY OF THE INVENTION

The present invention, however, proposes that the division between monitoring inputs and mixing inputs be eliminated, and for the modules to be identical. Then the modules are connected to a common control, which acts on the circuits of each module to activate, or deactivate them as desired. Thus the functions carried out on a signal to a particular module may be selected at the common control.

Thus, a large number of identical input channels may be provided, each capable of receiving any suitable signal, be it tape output, effects device, or source. These signals are then mixed to one or more common output buses, with multiple outputs available from stereo (stereo bus and stereo monitor) according to the needs of the moment. Since the full range of input functions carried out on a signal to the corresponding input (e.g. equalization, inserts, auxiliary sends, automation, etc.) may now be used selectively on most signals, these multiple inputs effectively need to be standard input channels with all normal functions except for a monitor mix section.

Normally, many of the various functions of the circuits of each module were activated (i.e. switched into or out of the signal path) by electromechanical switches in the module. Preferably, in a console according to the present invention at least some of those electromechanical switches are replaced by switching by the common control of the units. This enables the electromechanical switches to be dispensed with. Furthermore, a suitable memory in the control unit may store one or more selected patterns of activation of the module circuits, so that the pattern may be reset when desired.

The removal of most or all of the electromechanical switches from the modules chassis leads to increased reliability as well as a reduction in module width and, potentially, better control room performance.

A system in accordance with the invention in which the functions to be performed by the modules to be selected allows many problems of size, ergonomics and general difficulty of operation, together with those of supplying consoles in various configurations, to be overcome.

The removal of the monitor mix and associated routing sections from each module permits a reduction in the width of each module, and thus a reduction in the overall length of the console for a given number of input channels. Conversely, for a given console width there can be a considerable increase in the number of input channels.

In this way, not only may a console according to the present invention be much more manoeuvrable than a console of conventional design with an equal number of input channels, but it also occupies less space in the control room. The initial importance of this is that although very large consoles are undoubtedly impressive to look at, they are recognized as being the primary disturber of the acoustic environment in the control room. Thus a better acoustic performance becomes feasible with a smaller console.

Also in video and teleproduction applications, space is often at a premium and audio facilities generally come a poor second to video. In many cases a new audio desk must be fitted into existing space originally designated for much less sophisticated sound equipment. Thus whilst complex consoles are now often required, not much room is allocated for them. Space is similarly at a premium in mobile recording and video production (EFP) trucks, where many inputs are often needed, especially as video shoots and live coverage increases in size and scope. Hence a reduction in console size is again advantageous for broadcast and video production requirements. Similar comments apply to recording studios in which existing consoles need to be replaced by much "larger" ones (in terms of inputs) in order to keep up with the number of inputs required by contemporary technology, preferably without engaging in the expense of tearing the control room apart.

The absence of a dedicated monitoring section in the mixer of each input channel of the console of the invention also permits the console to be made simpler since the confusing division between monitoring and mixing has largely been removed. Thus the increased number of inputs is compensated for by a reduction in complexity of the console, making the engineer's task proportionally simpler at the point when he has to focus his attention on a greater number of signals.

The activation of circuits giving particular functions within each module may be achieved by suitable solid-state switching devices within the module, which switching devices are controlled by e.g. a microprocessor in the central control. That control may be operated by a keyboard.

The central control preferably contains a memory for storing information relating to the various modules. As discussed above, that memory may store preset patterns of activation of the circuits of the module, to enable them to be "reset". In addition, however, many of the functions carried out by the circuits of the module will have manually operated controls for varying the effect of the function, and the memory may store selected positions for those controls. Then a display associated with each unit may be used to determine when the manually operated controls have been positioned at the selected positions stored in the memory, i.e. the stored position may be "recalled". Indeed, the memory may store a plurality of different positions, and the operator can then select which of the stored positions is to be used. In practice, this means that different configurations of the functions carried out by the console on input signals can be memorized, so that the console may be changed rapidly from one configuration to another as the console is set up for different jobs.

Of course, the memory of the common control of the console may have different "levels" corresponding to different priorities of stored information.

Furthermore, the common control may have suitable displays for displaying the functions it is controlling. Then, by providing a suitable switch or other means on each module, the control may be caused to display the information relating to that module in the memory. Thus it is very easy for the operator to check which functions are to be carried out by a given module, and change them as desired.

Also, the use of advanced mixing systems, such as the GML (George Massenburg Laboratories) moving fader system, is possible and AFV (Audio Follows Video) ports for remote control of levels and mutes from video equipment can be provided. Furthermore, increased amounts of output buses (up to 64) facilitate assignment to multitrack recorders and stereo machines and the buses can be used as extra auxiliary send outputs when using multiple effects devices.

The common control may also be used to select which of a plurality of bus lines of the output bus a given module is connected. Again, the connections may be stored in the memory for repeated use.

In the console of the invention data is handled in much the same way as in a word processor with the difference that the final output is an audio signal which has been allowed to pass through the console in a set way, en route to the speaker units, and the tape recorders. Like all computer controlled systems the process can be repeated over and over again. The proposed console design thus applies microprocessor capabilities to the signal path structures within the console to expedite instant setup, long term memory storage, and repetitive control.

BRIEF DESCRIPTION OF THE DRAWINGS

An embodiment of the invention will now be described in detail, by way of example, with reference to the accompanying drawings, in which.

Figure 1:
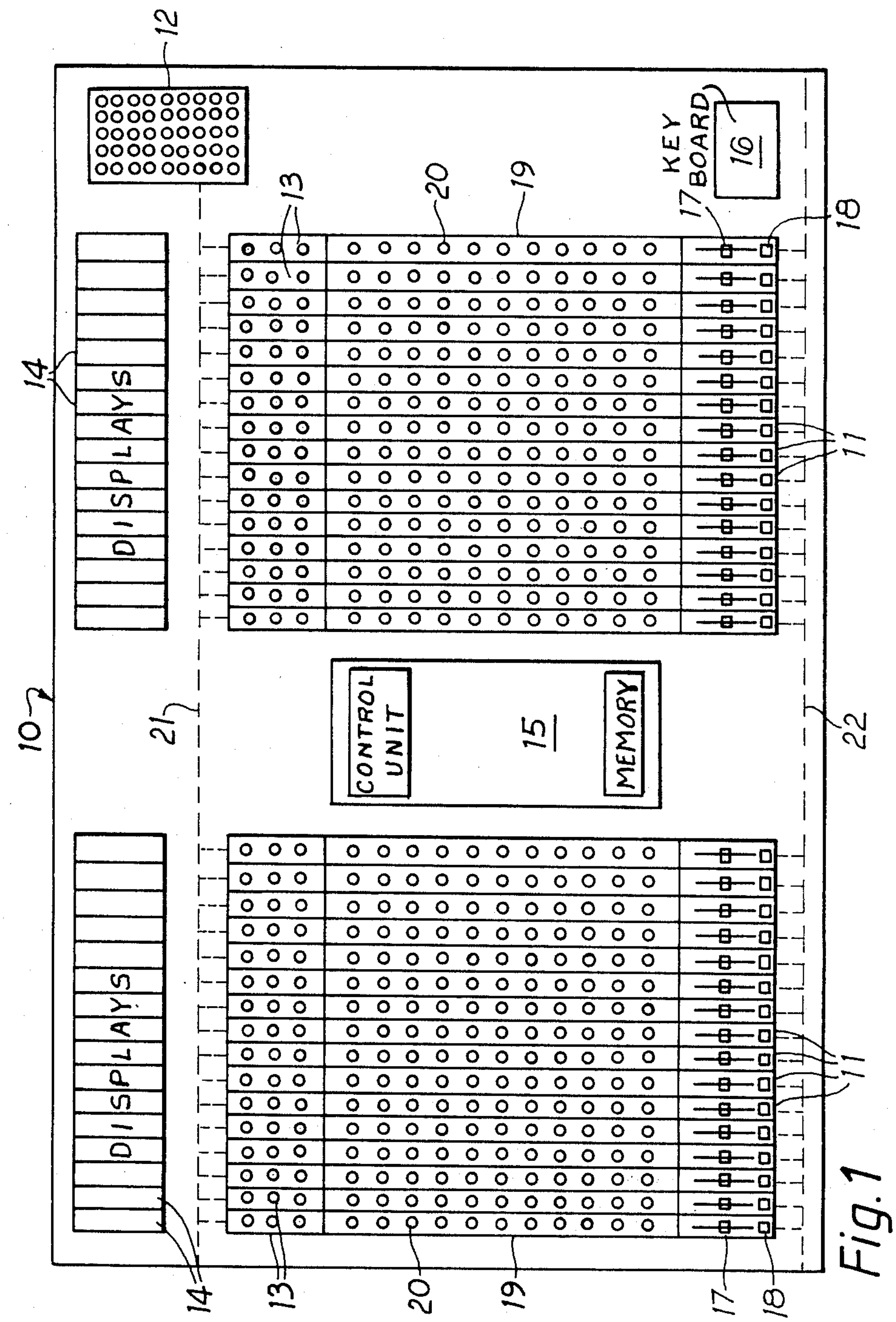
FIG. 1 shows a schematic plan view of a console according to the present invention.
Figure 3:
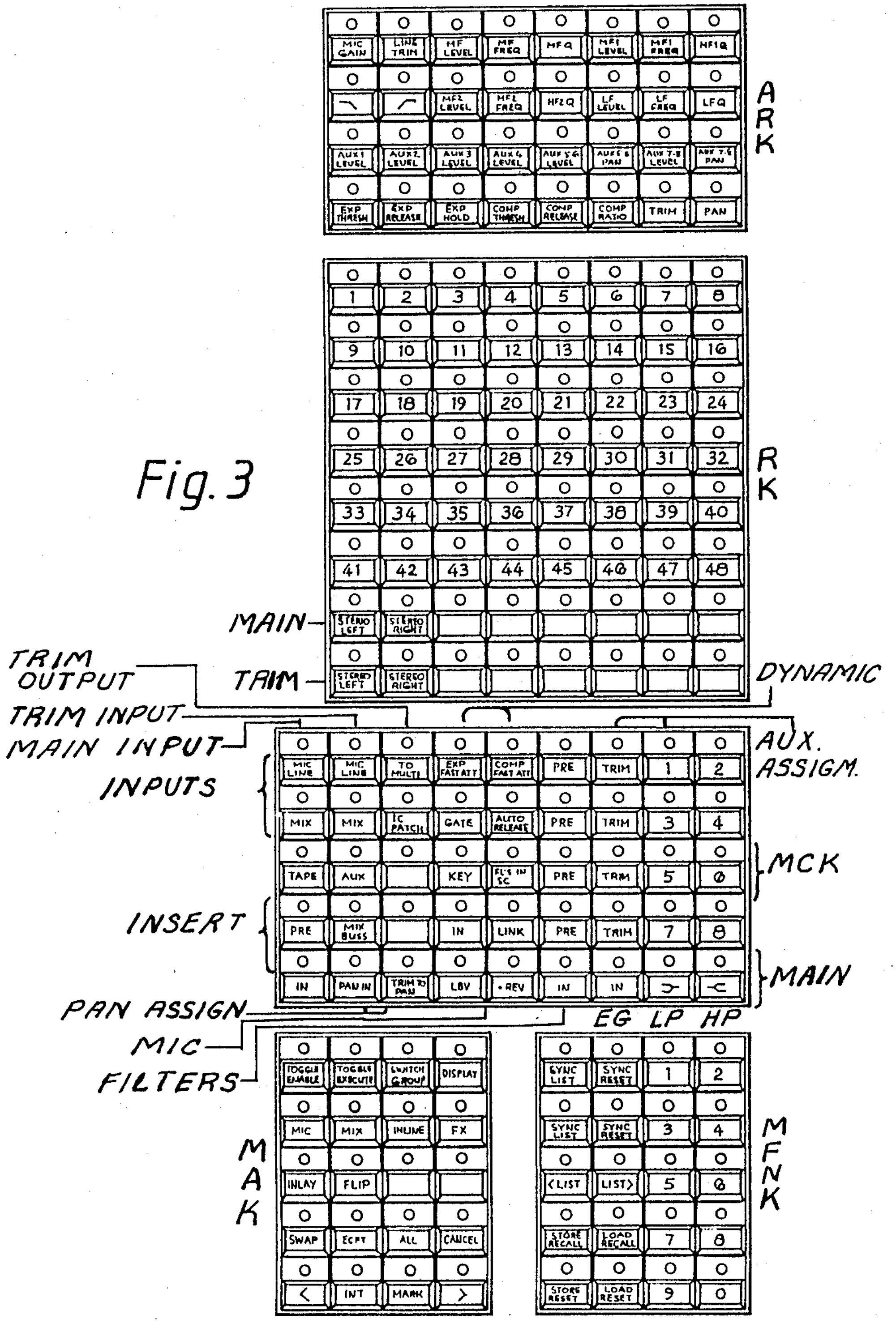
Figure 4A:
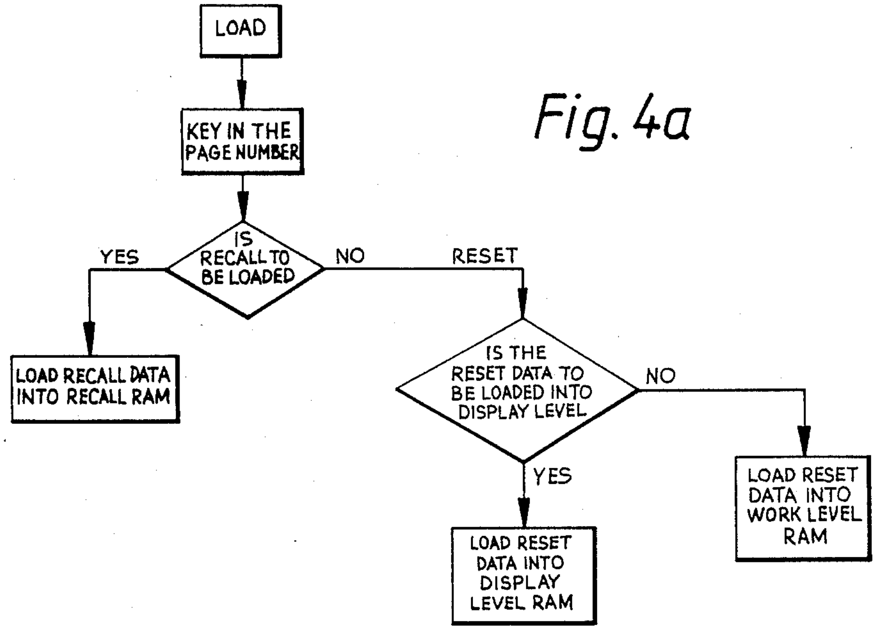
Figure 4B:
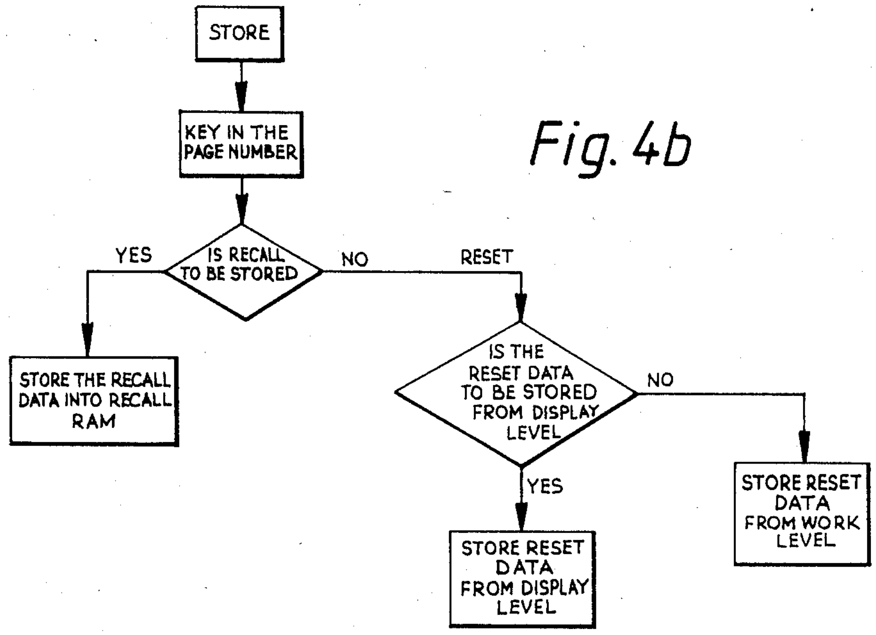
Figure 5:
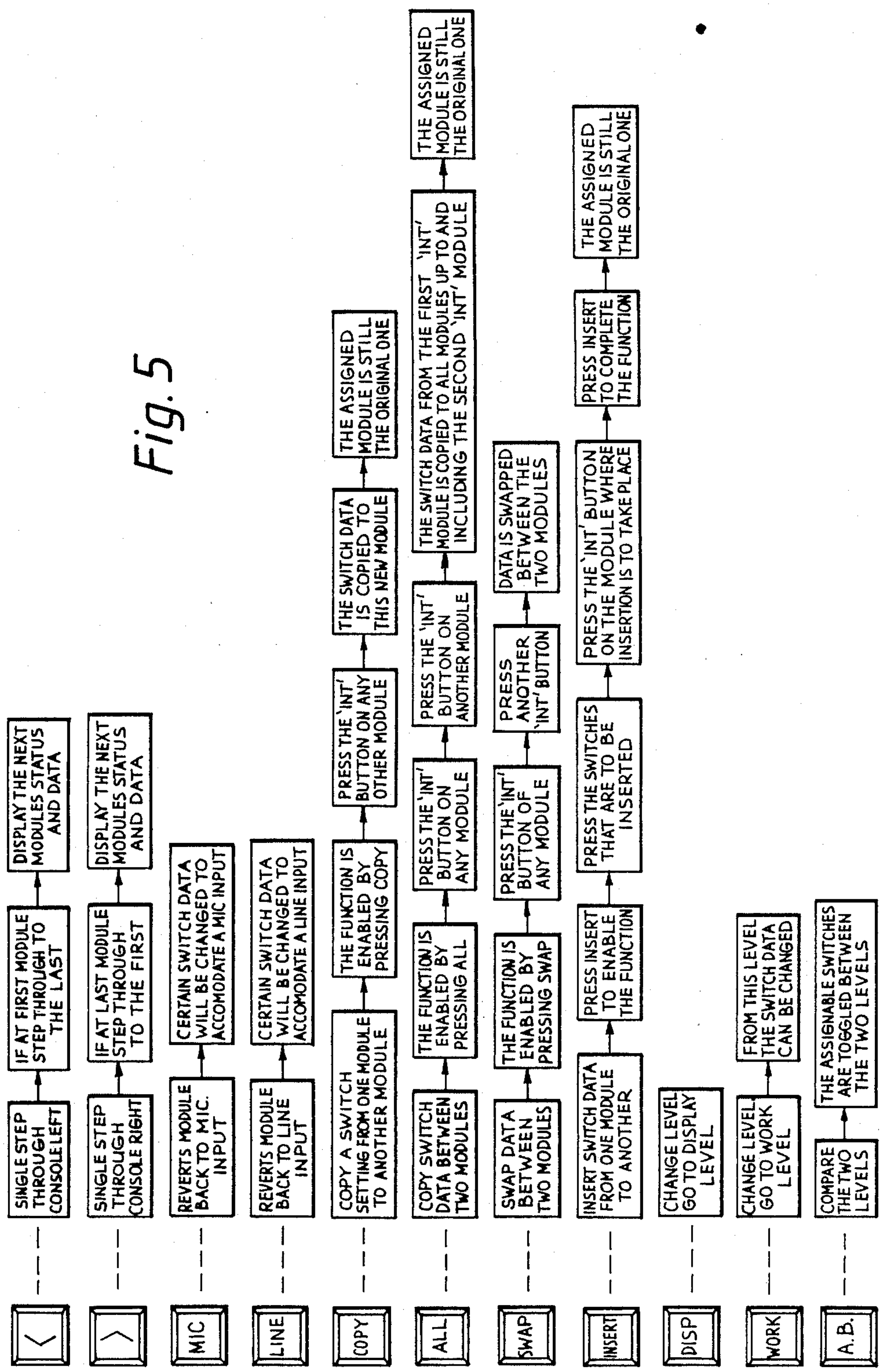
Figure 6:
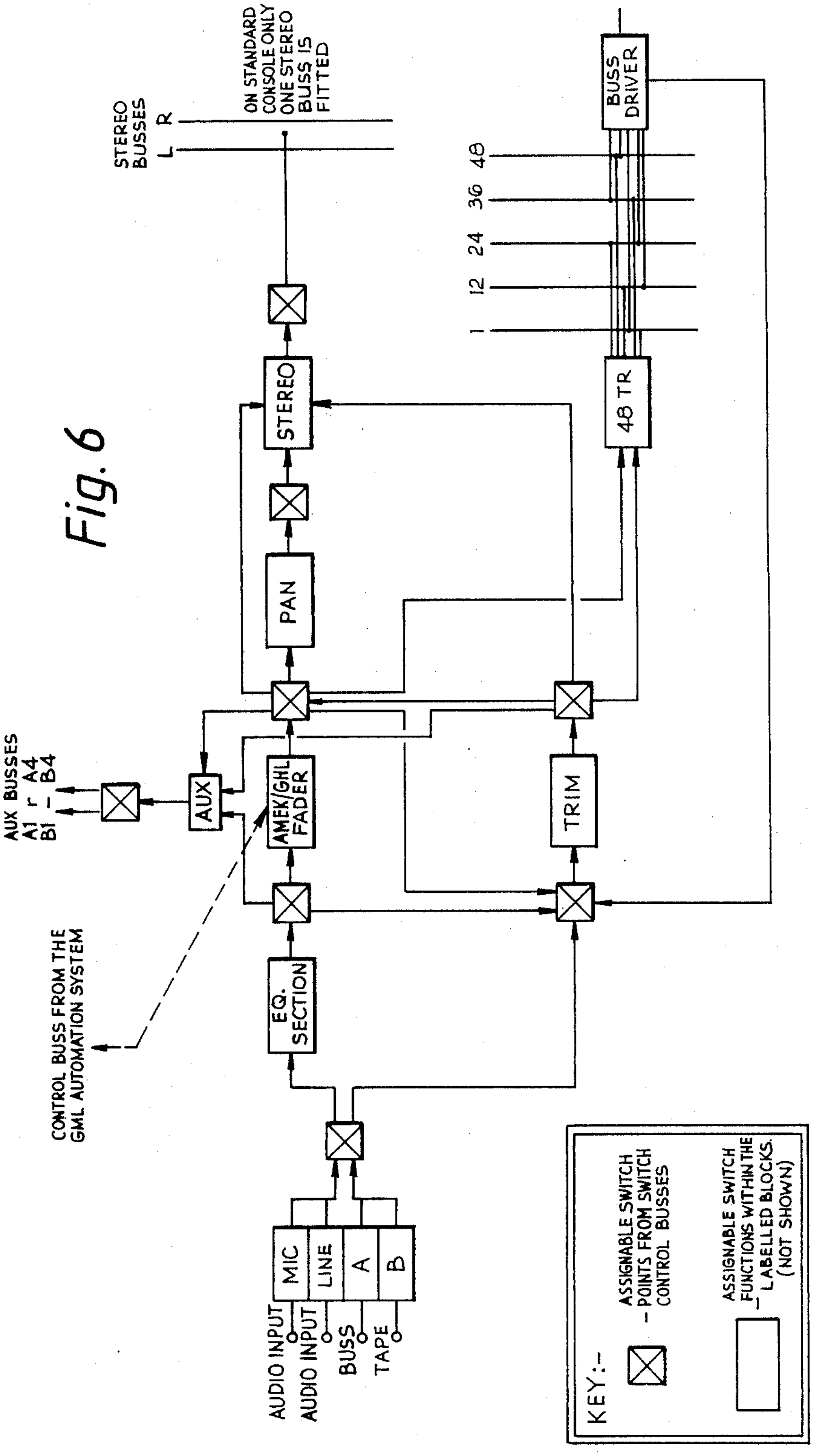
Figure 7:
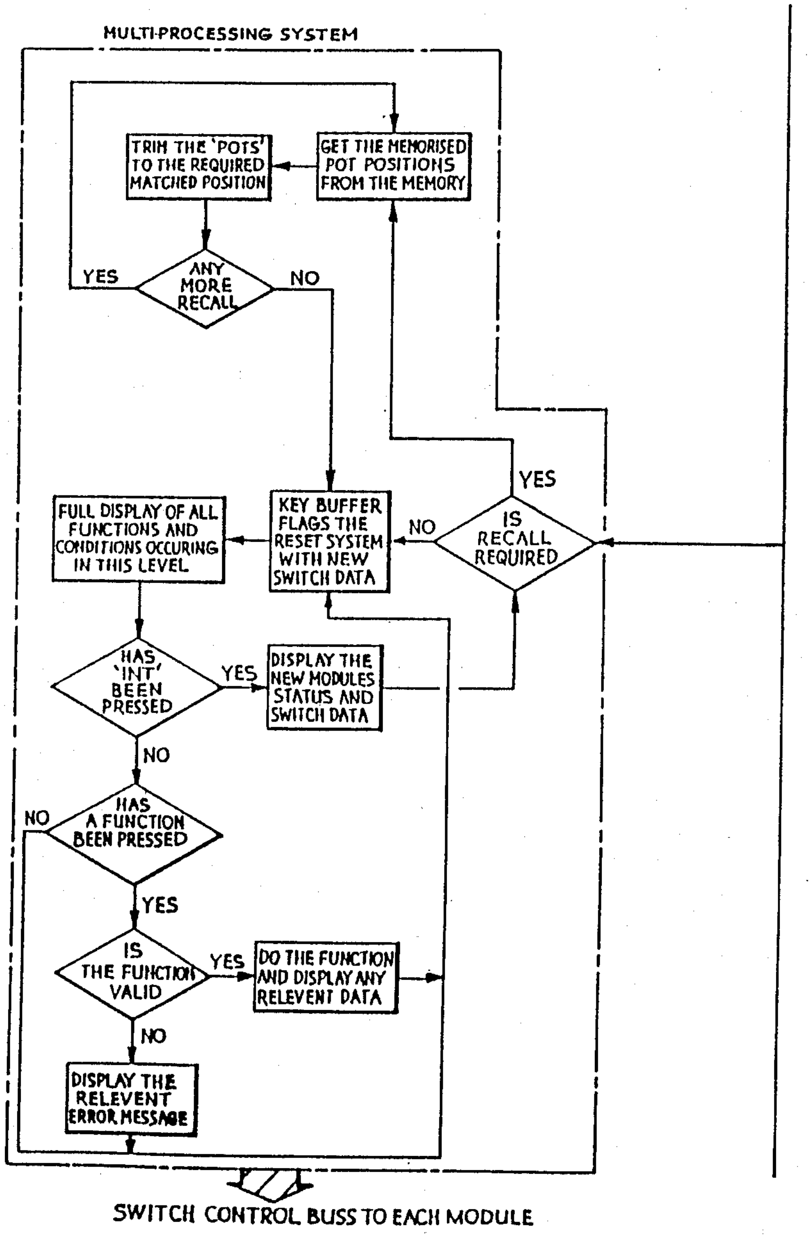
Figure 7:
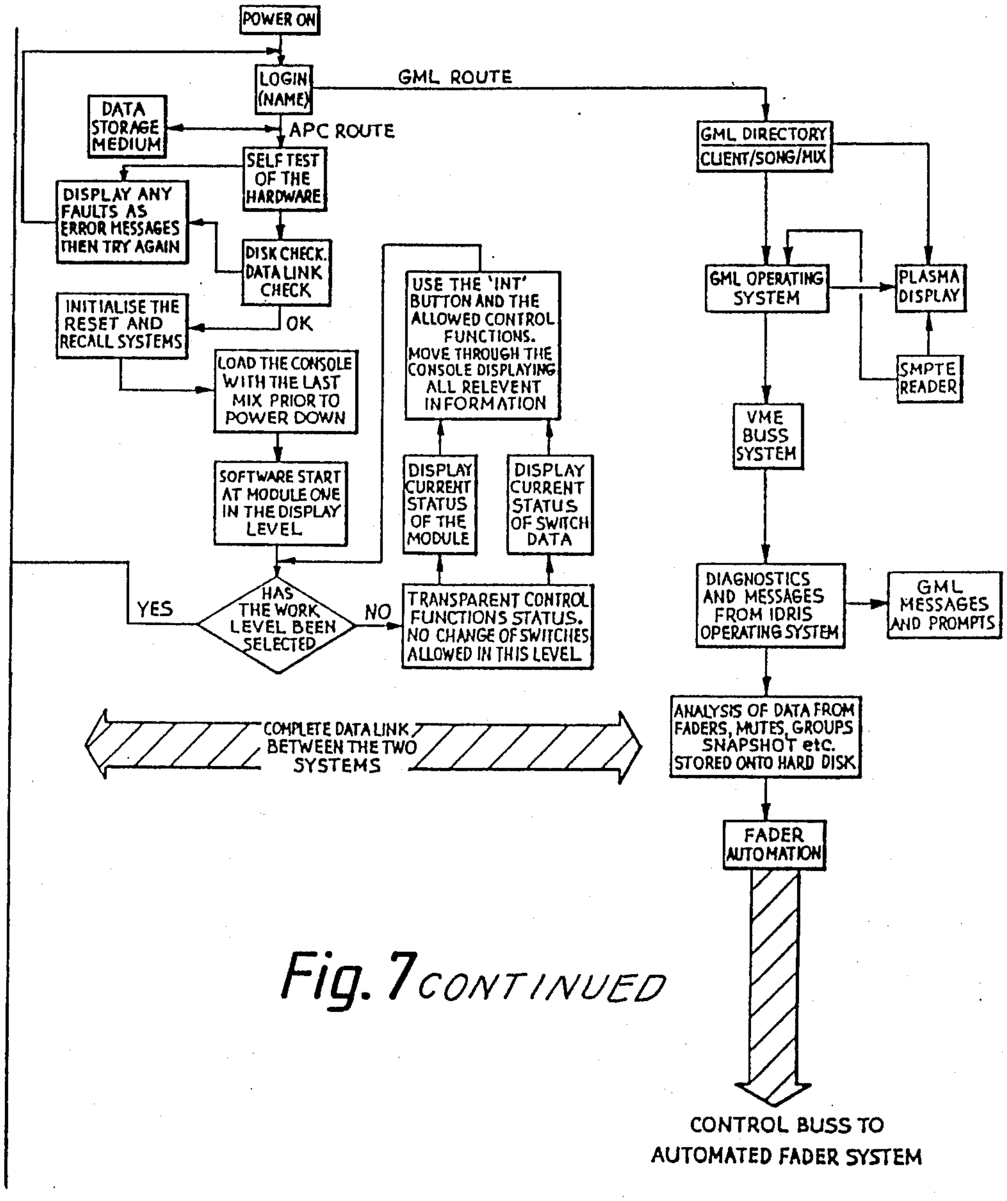

FIGS. *2a* to *2d* show an input module and additional modules for each channel of the console of FIG. 1;

FIG. 3 is a detailed view of the control unit of FIG. 1;

FIGS. 4*a* and 4*b* are simplified diagrams of memory operations;

FIG. 5 is a diagrammatic representation of the various control functions;

FIG. 6 is a simplified diagram of the audio path within a module of the console of FIG. 1; and FIG. 7 is a simplified diagram of the operating system of the console of FIG. 1.

DETAILED DESCRIPTION

Referring first to FIG. 1, a console 10 has a large number of identical elongate modules 11, each capable of carrying out a plurality of functions on an audio signal arranged side-by-side along the width of the console 10. Each module 11 is connected to a corresponding input, and the inputs of the modules may be located at a common input block which may be mounted in the front of the console as shown at 12, or at another location as is convenient. Additional modules 13 for carrying out additional functions may be connected in series to the modules 11, and each module 11 also has a corresponding display 14. These components will be discussed in more detail later.

As compared to known consoles, the modules 11 do not have a mechanical switch for activating each of the functions of the module, but instead at least some of the functions are controlled by a control unit of the console, and so the module may be made narrower than existing modules, e.g. may be approximately 30 mm wide. In this way, the total width of the console may be made smaller than with existing arrangements. As illustrated, there are two blocks of 16 modules, making 32 in all. However, the number of modules may be freely chosen, depending on the number of input channels of the console.

Also shown in FIG. 1 is a common control unit 15 for controlling the operation of each of the modules 11,13, and there may also be a keyboard 16 for programming into the control unit 15, the various operations that are to be carried out.

As shown in FIG. 1, each module 11 has a fader section 17 with a switch 18 which causes a display in the control unit 15 (not shown in FIG. 1) to display the various functions that module 11 is currently programmed to perform. Each module 11 also has a central part 19 with a row of knobs 20 for adjusting e.g. potentiometer settings within the module 11.

Figure 2A:
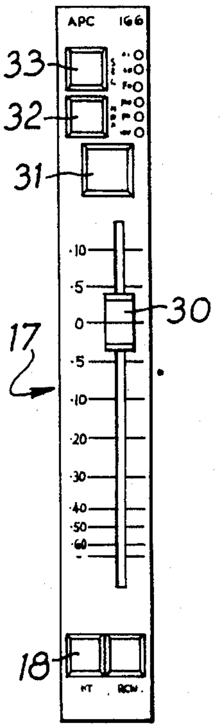

The module 11, the additional module 13, and the display 14 for each input will now be described in detail with reference to FIGS. 2*a* to 2*d*. FIG. 2*a* shows the fader section 17 of the module 11, which, as illustrated, has a manually adjustable slider which controls the output level of the module. Various different types of faders may be used, for example a VCA-fader with digital grouping which may be connected to an Audio Kinetics Mastermix computer, or a motor-driven fader which is linked to a GML computer. These fader arrangements are known in the art and will not be discussed in more detail now. In addition to the switch 18 for causing the control unit to produce a display for that module (hereinafter referred to as "the interrogate") (INT button), the fader section 17 may also include a Mute control 31 which cuts off all output signals from that module, and additional switches 32,33 which interact with the control unit 15 in dependence on the various functions the module is to perform, e.g. when it is acting as a monitor.

Figure 2B:
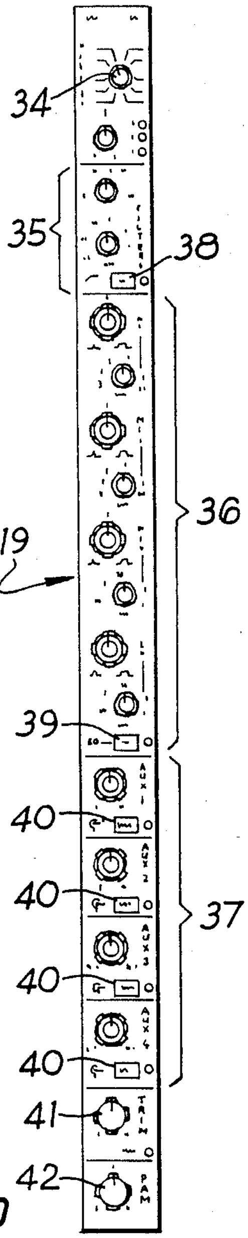

Referring now to FIG. 2*b*, the central part 19 of the module 11 has a plurality of manually adjustable knobs 20 and also possibly switches, which interact with the various circuits within the module 11 for carrying out the functions of the module, which in turn are activated by the control unit. Thus, the central part 19 of the module 11 may have a control 34 for selecting input sensitivity, filters 35, an equalizer system 36, and auxiliary circuits 37. It can be seen that in addition to the control by the control unit 15, there may be over-ride switches 38,39,40 associated with the filters 35, the equalizer 36, and the auxiliary circuits 37 as desired. A trimming potentiometer 41 may be switched into, or out of, the signal path by the control unit 15, and a panpot 42 may then act on either the trimmed, or untrimmed signal as determined by the control unit 15.

Figure 2C:
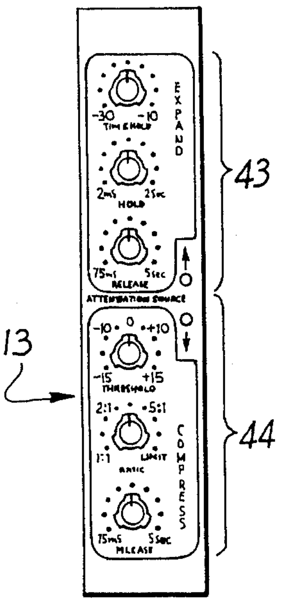

FIG. 2*c* shows an additional module 13 which is an optional dynamics module, which receives an input signal, expands and/or compresses it as appropriate using expander 43 and/or compressor 44 as appropriately determined by the control unit 15, before the input signal is fed to the central part 19 of the module 11.

Figure 2D:
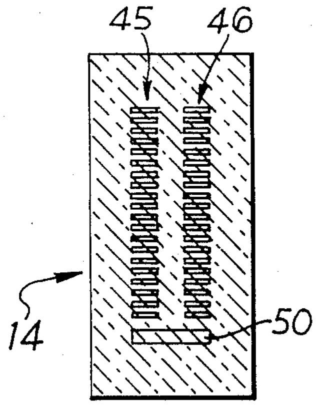

Finally, FIG. 2*d* shows the display 14 associated with each module 11. Each display 14 has two parallel lines of LEDs 45,46, one of which displays the actual position of a selected control of the module 11, whilst the other displays a position stored in the memory of the control unit 15. There are preferably 20 LEDs in each row, 19 of which are used to display the position of the potentiometer, with the 20th LED used to indicate exact correspondence with the memorized value. The use of an odd number of LEDs to display the potentiometer position means it is easy to display the central position of that travel. Thus, for example, the control unit 15 may be caused to display on one row of LEDs the stored position of e.g. one of the rotary potentiometer controls of an auxiliary unit 37, and then that rotary control may be adjusted until the memorized position is reached.

The display may also be used to indicate the level of the signal on the channel connected to that unit.

The control unit 15, and its interaction with the various circuit elements of the modules 11 and the auxiliary modules 13 will now be described with reference to FIG. 3. FIG. 3 shows the keyboard of that control unit 15. The keyboard comprises five separate areas designated as follows:

| | |
|---|---|
| Active Recall Keyboard | (ARK) |
| Routing Keyboard | (RK) |
| Module Control Keyboard | (MCK) |
| Module Assign Keyboard | (MAK) |
| Memory Function and Numeric Keyboard | (MFNK) |

It will be noted that there is an LED adjacent and, indeed, corresponding to each key.

Basically, when any particular channel is interrogated or accessed by pressing an interrogate (INT) button adjacent that channel, or an INT button and the channel number in the MAK and MFNK keyboards, the keys in the ARK, RK and MCK keyboards represent the switch, potentiometer and fader set-up of that channel. A large horizontal green LED, immediately above each channel and at the base of the Recall bars (referred to below) lights up to indicate which channel is being interrogated.

The active Recall keyboard (ARK) allows information stored in a Recall memory page and relating to any particular channel to be used to match the actual position of any of the rotary potentiometers with the relevant memory position. This Recall system is permanently active and may be used at anytime simply by pressing the LOAD RECALL button in the MFNK keyboard. Each button on the ARK represents one particular rotary function in the accessed channel and when a button is pressed the LED immediately adjacent to it lights up and the vertical rows of LEDs 7 above the relevant channel, usually called Recall bars, show the memorized potentiometer setting in green and the current level in red. The knob can then be physically turned until the two side by side scales match, i.e. until the red is the same as the green. The microprocessor continually monitors the change in the actual setting (hence the use of the designation ACTIVE) and when there is exact correspondence the top two LED bars (both red and green) flash on and off. This is especially useful in cases where high resolution may be required, e.g. in frequency adjustment.

The Recall functions represented by the respective buttons of the ARK keyboard are identified as follows:

MIC—microphone amplifier gain setting
LINE—line amplifier gain setting/mic fine gain
HFB—high frequency boost/cut
HFF—high frequency bandcentre
HFQ—high frequency Q (slope)
MF1B—mid-frequency 1 boost/cut
MF1F—mid-frequency 1 bandcentre
MF1Q—mid-frequency Q (slope)
HIGH PASS FILTER—frequency setting
LOW PASS FILTER—frequency setting
MF2B—mid-frequency 2 boost/cut
MF2F—mid-frequency 2 bandcentre
MC2Q—mid-frequency 2 Q (slope)
LFB—low frequency boose/cut
LFF—low frequency bandcentre
LFQ—low frequency 2 Q (slope)
A1—auxiliary 1 level
A2—auxiliary 2 level
A3—auxiliary 3 level
A4—auxiliary 4 level
A5—auxiliary 5-6 level
A5-6P—auxiliary pan position
A7—auxiliary 7-8 level
A7-8P—auxiliary pan position
ETH—expander threshold
EREL—expander release
EHLD—expander hold
CTH—compressor threshold
CREL—compressor release
CRAT—compressor ratio
TRIM—trim level
PAN—pan position The Routing Keyboard represents the various channel switches of a conventional console, which switches are now incorporated in the underlying circuitry. When a channel is interrogated its switch set-up is indicated in the RK keyboard by the illumination of the LEDS adjacent those switches which are ON. The ON/OFF state of any particular switch can be altered merely by pressing the relevant button. Whether switches are On or OFF determines the electronic pathways of the various channels. The function represented by the respective buttons are as follows:

1 to 48 allows individual selection of 48 output buses. Each routing switch can also function as a RECORD ENABLE control for the track.

STIL and STIR allows individual selection of the stereo buses, Left and Right, from the MAIN signal path.

TST1L and TST1R allows individual selection of the stero buses, Left and Right, from the TRIM signal path.

The Module Control Keyboard (MCK) allows configuration of the channel signal paths from input to output. Again, selection of any particular function is indicated by illumination of the adjacent LED. The keyboard is made up as follows, taking each section in turn:

MIC/LINE selects MIC or LINE input to the channel MAIN signal path. When the LED is not illuminated, MIC input is selected. To obtain LINE, the button should be pressed.

MIX selects the BUS/TAPE inputs to the channel MAIN signal path. When the LED is not illuminated, MIC/LINE input is selected. To obtain BUS/TAPE, the button should be pressed.

TAPE selects either OFF BUS or OFF TAPE signals to the main channel input (for use when the main or trim inputs are selected to mix). When the LED is not illuminated, BUS input is selected. To obtain TAPE the button should be pressed.

The normal monitoring method in this audio production console is to use the stereo bus. Thus the input channels connected to the multitrack machine will have their outputs routed to the stereo bus. The BUS and TAPE inputs will also be used when it is desired to make either an audio subgroup (submix) or a track reduction (track bounce).

INSERT

IN selects the channel insert in circuit.

PRE selects the channel insert pre equalizer and fitters. The insert point is in the MAIN signal path and cannot be routed to TRIM.

PAN ASSIGN

PAN IN brings the pan control into operation.

TRIM TO PAN removes the panpot from the MAIN signal path and places it in the TRIM signal path.

When the PAN is assigned out of circuit an equal level is sent to the selected Left and Right (or Odd and Even) buses. The input to the PAN is normally connected to the MAIN signal path output. Its output may normally be routed out to the stereo and multitrack buses.

MIC

+48 V supplies phantom power to the mic input.

φ.REV reverses the phase of the signal selected to the MAIN input.

FILTERS

IN selects the Hi and Lo pass filters into circuit. A filters in/out switch is fitted to the module. The action of this switch is to inverse the keyboard-assigned setting. However, use of the local switch does not change the condition held in the memory.

EQUALIZER

IN selects the equalizer into circuit. An equalizer in/out switch is fitted to the module. The action of this switch is to inverse the keyboard-assigned setting. However, use of the local switch does not change the condition held in the memory.

TRIM LP switchs the low frequency band of the equalizer from bell to shelf.

HP switches the high frequency band of the equalizer from bell to shelf.

TRIM INPUT

MIC/LINE selects the TRIM input to follow the MAIN input MIC/LINE switch. Note that MIC/-LINE and BUS/TAPE signals can be selected to both MAIN and TRIM signal paths at the same time. However, the inputs to both signal paths will be the same; both inputs will be MIC if MIC is selected, and both LINE, if LINE is selected. It should also be noted that the FINE gain control only operates on the MAIN signal path.

MIX selects the TRIM input to follow the MAIN input BUS/TAPE switch.

AUX selects the TRIM input from the pre-fader output of AUX 1 (N. B. This may also be configured by an internal jumper to be the pre-fader output of Aux 3).

The principal reason for routing AUX 1 to the input of TRIM is to enable extra auxiliary send outputs to be created by routing the TRIM output to the Multitrack buses. The Pre/Post function is retained. In the simplest terms this means that an extra 48 outputs can be obtained from the Aux send signal. These can be patched into FX devices as required. More practically, the 48 buses can be split over a number of inputs and FX devices allowing a great extension of control over inputs to and outputs from FX equipment.

MIX/BUS assigns the input of the TRIM control to the mix bus output, i.e. on chan 1, mix bus 1 will be selected, and so on up to 48. This routes the bus signal into TRIM and allows an audio subgroup to be set up. Thus the input to MAIN can be set to TAPE whilst the TRIM input can obtain its input from the BUS of the module concerned.

If for example AUX to TRIM function was being used to create extra sends and several channels were required to be sent to an FX unit and overall level control was required over the mix of signals going to the FX, the BUS INPUT will assign whatever is going to the module's bus to the TRIM control. It is then possible to assign the output of the TRIM by using TRIM TO PATCH giving an overall output level control at the patchfield.

TRIM OUTPUT

MULT TO TRIM transfers the multitrack routing from the MAIN signal path output to the TRIM output.

TO PATCH assigns the output of the TRIM control to the post mix stage of the bus/mix amp. Each bus is brought through a half-normalled pair in the jackfield and terminated in a multiway. This is usually connected to the input of the multitrack machine. By assigning BUS INPUT and TRIM TO PATCH together, control of the output level of the respective bus can be obtained using the TRIM pot, simulating a group fader. Thus, for example, output level of bus 18 will be controlled, in this mode, by the TRIM control on module 18.

AUX ASSIGN

PRE (1–8) switches the input to the Aux send pre the selected input source fader, be it TRIM or MAIN.

TRIM selects the input to pairs of Aux sends from the TRIM control.

1 to 8 Aux in/out; switches the aux send on.

DYNAMICS (the Dynamics section is optional):

EXP FAST ATT expander fast attack

COMP FAST ATT compressor fast attack

GATE selects Gate mode

AUTO RELEASE compressor program controlled release

KEY selects Side Chain insert in/out

FLTS IN SC inserts pass filters to sidechain

IN dynamics section in

LINK links dynamics section to next channel on right for stereo operation

The MODULE ASSIGN KEYBOARD (MAK) enables various master console set-up functions, which are described briefly in the following:

INT (LOCAL) This is to assign any channel from the central keyboard area. When pressed, INT causes the channel display (mentioned later) to flash with the letters CH. The computer is wating for a two digit entry from the numeric section of the MEMORY FUNCTION and NUMERIC KEYBOARD (MFNK). When the number is entered, the computer will interrogate the channel which has been selected, illuminating the long horizontal LED behind the selected channel, indicating its channel number on the central display, and the MCK and RK will display the functions selected on that channel. The recall system may also be used by way of the ARK.

< steps the INT channel number down by one. The number of the 'new' channel is displayed and its switch configuration data shown by the LEDs adjacent the RK keyswitches. The rotation is cyclic; if the present channel assigned is number 1, operation of this function will bring channel number 64 resident in the keyboard (in a 64 channel console).

> steps the INT channel number up by one. The number of the 'new' channel is displayed and its switch configuration data shown by the LEDs in the keyswitches. The rotation is cyclic; if the present channel assigned is number 64, operation of this function will bring channel number 1 resident in the keyboard (in a 64 channel console).

MARK by enabling this function the number of the presently assigned channel is memorized. The MARK display will indicate the number of the 'marked' channel. The engineer may then INTerrogate other modules as required, but can return to the MARKed channel when required simply by a second press of the MARK button.

SWAP allows switch settings and Recall data to be swapped between any two channels. After enabling this function the computer memorizes the switch and Recall data of the currently-assigned channel. A second channel is assigned from the keyboard. A further press of SWAP loads the data from the first channel into the second, and from the second into the first.

COPY allows copying of switch and Recall data from any one channel to another, making their data idenitcal. The currently-assigned channel and its data becomes the 'Master Copy Data'. Another channel is assigned from the keyboard. When COPY is pressed again, the master data is loaded into the newly-assigned channel.

ALL loads all selected modules with the same data. The first press of ALL will instruct the computer to memorize the switch and Recall data for the presently-assigned channel. This becomes the 'Master All Data'. Another channel is assigned. When ALL is pressed again, the Master All Data is loaded into all of the channels inbetween and including the last channel assigned while in this function.

CANCEL when pressed this keyswitch will halt the execution of the following:

| | | | |
|---|---|---|---|
| INT (LOCAL) | | | |
| DISPLAY | SWAP | | COPY |
| ALL | MIC | | MIX |
| INLINE | | FX | |
| INLAY MIX | | INLAY | INLINE |
| INLAY FX | | INLAY | MIC |
| TOGGLE ENABLE | | | |
| STORE RESET | | | |
| LOAD RESET | | | |
| STORE RECALL | | | |
| LOAD RECALL | | | |
| DYNAMIC LIST | | | |
| SYNCHRONOUS LIST | | | |

Of course, the memory is not in any way affected by use of this keyswitch.

TOGGLE allows one module switch function (e.g.; Insert In) to be toggled on/off for a group of channels.

TOGGLE Mode is comprised of two stages: Setup and Execution.

TOGGLE ENABLE enables the Setup mode. When pressed this puts the computer into a different operational mode, allowing the MCK and RK keyboards to be used to select a switch to be toggled, and the channel INT buttons to be used to slave channels to the TOGGLE group. The INT switches on those channels intended to be group are pressed and these INT switches will illuminate. Any combination of channels can be assigned to the TOGGLE group. To de-assign a channel, its INT switch is pressed again. At the same time, the MCK and RK keyboards are used to select the switch you intend to toggle when TOGGLE EXECUTE is pressed. The required functions are simply selected on. Once setup is complete, TOGGLE ENABLE is pressed again to revert the computer to normal operating mode. Note when a switch is selected the default condition is off. If you require the switch to be on, then the TOGGLE EXECUTE switch is pressed whilst in TOGGLE ENABLE mode. Otherwise, actual execution of the TOGGLE function would always switch the function ON at first press, whilst you may in fact wish to switch OFF.

TOGGLE EXECUTE at the first press switches all the previously selected channel functions to OFF (ON) on all channels selected in TOGGLE ENABLE. At the second press TOGGLE EXECUTE will switch all the previously selected channel functions to ON (OFF).

MIC is an initial pre-programmed module switch setup that selects the INTerrogated module's MAIN signal path to a suitable configuration for basic microphone signal recording. The actual switches activated by MIC are:

AUX 1-4 ASSIGN ON
AUX 5-8 ASSIGN ON
AUX 5-8 PRE

No output routing selection is made.

MIX is an initial pre-programmed module setup that selects the INTerrogated module's MAIN signal path to a suitable configuration for basic stereo mixdown. The actual switches activated by this function are:

MIX
TAPE
AUX 1-8 ASSIGN ON
L+R STEREO ASSIGN ON

INLINE the input signal is on the MAIN path and a simulated inline monitor is formed around the TRIM control. The switches selected include:

| MAIN: | TRIM: |
|---|---|
| TAPE | BUSS-TAPE |
| AUX 1-4aASSIGN ON | |
| AUX 5-8 ASSIGN ON | |
| AUX 5-8 PRE | |
| L+R STEREO ASSIGN | |

FX the channel acts as an effects return. The input on the MAIN path but is also rerouted out to the multitrack bus for 'sub-mixdown' via TRIM. The switches selected include:

| MAIN: | TRIM: |
|---|---|
| LINE | LINE |
| L+R STEREO ASSIGN | MULT TO TRIM |
| PAN IN | |

INLAY is normally used in conjunction with MIC, MIX, INLINE and FX and allows them to be overwritten in an existing channel switch setup. Use of MIC, MIX, etc, by themselves clears a channel of all other existing switch data. When used with INLAY, all existing data is preserved except for those functions which are covered by MIC, MIX, etc (as described above). The keyswitch press routine is INLAY followed by MIC when an INTerrogated channel is resident in the computer.

DISPLAY shows which switch functions are common to which modules; or monitor the status of a particular switch throughout the entire console. For example. pressing the EQ IN switch on the MCK in this mode will display all channels selected EQ IN by illuminating the long horizontal green LED behind each channel. In DISPLAY mode all the LEDs on the MCK and RK are switched off allowing functions to be DISPLAYed to be selected clearly.

The FLIP button and the SWITCH GROUP button function will be described later with reference to the MFNK keyboard, since their functions will be more easily understood after certain other of the MFNK functions have been described.

The CENTRAL STATUS DISPLAY, which is a multifunction display area located above the central keyboard area, has already been mentioned several times. It provides details of the channel being interrogated, any channel for which the MARK button has been depressed, the memory area presently being used, lists for dynamic and synchronous reset systems (see hereinafter), and MAIN and TRIM signal path constructions in the channel being interrogated.

As described in the earlier application, the console has three memory levels dented LIVE, SAFE and PAGE. The LIVE memory is the normal active memory area where keyswitch entry and changes are entered and stored automatically. PAGE is a final memory of all the switch functions for the entire console, stored from the LIVE memory and denoted by a number. Multiple pages can be created. SAFE is a backup copy of the initial contents of the LIVE memory, e.g. when a PAGE is created a backup is also made into the SAFE memory area. On loading a previously stored console setup from a page into the LIVE memory, the previous console setup is still retained in SAFE if it has also been STOREd.

As just mentioned, the memory area currently being accessed is shown in the Channel Status Display, the words LIVE or SAFE being illuminated along with their respective numbers.

The memory levels are protected by long-life battery back-up from accidental erasure through power-down conditions.

Finally, the functions designated by the buttons or keyswitches of the MEMORY FUNCTION and NUMERIC KEYBOARD will be briefly described.

STORE RESET stores the switch data, i.e. the data indicated by the RK, for the entire console into a separate area of memory called a 'page'. To store a page, the STORE RESET function is enabled by pressing the keyswitch. The master display above the keyboard will flash the prompt SP (Store Page). The computer is now waiting for a two-digit entry from the numeric section of the central keyboard. If, for example, the number selected is 12, then the present state of all of the switch data for the console is now in the page of memory area at section 12. Note that the LIVE memory remains unchanged but the SAFE memory area has its last data overwritten with a 'back-up' copy of the LIVE memory which has just been stored. 16 PAGEs of memory are available in the console.

STORE RECALL stores the RECALL data, i.e. the potentiometer settings indicated in the ARK, for the entire console into a separate area of memory called a 'page'. To store a page, the STORE RECALL function is enabled by pressing the keyswitch. The master display above the keyboard will flash the prompt SP (Store Page). The computer is now waiting for a two-digit entry from the numeric section of the central keyboard. If, for example, the number selected is Ø1, then the present state of all of the switch data for the console is now in the page of memory area at section Ø1. 16 PAGEs of RECALL memory are available in the console.

LOAD RESET enables a page of switch setup data to be reloaded into the console. On pressing LOAD RESET the display above the keyboard will flash the prompt LP (load page) and then wait for a page number to be keyed in. This is the source page for the console switch settings you wish to load. The page number which has been loaded will overwrite the current contents of the LIVE memory and will change all the switch settings accordingly. SAFE is not overwritten.

LOAD RECALL enables a page of RECALL data to be reloaded. The operation of this function is similar to LOAD RESET.

NUMERIC KEYS Ø to 9 individual keys numbered Ø to 9 are provided for use in all functions where numeric identification is required. Single figure numbers should be prefixed with a Ø, e.g. Ø9.

The FLIP function in the MAK exchanges the LIVE memory with the SAFE memory. When a STORE RESET has been executed the contents of the LIVE memory are stored as a page. At the same time, a 'back-up' is made which is placed in a memory area called SAFE. In order to compare the current contents of the LIVE with the last STOREd page (held in SAFE), FLIP is pressed and the contents of the two memory areas are exchanged. The switch settings for the console of course will also change. To revert to LIVE, FLIP is pressed a second time.

Turning back to the MNFK, a DYNAMIC RESET system allows a number of memory pages to be cued up in an operator-determined sequence (Dynamic List) and loaded into the console as required. The DYNAMIC RESET system is comprised of two stages: listing and execution.

To enter into DYNAMIC RESET mode, the function key DYNC LIST on MFNK must be pressed. The DYNAMIC LIST DISPLAY in the meterhood indicates a sequence of up to 3 pages. At present, only two blocks of 8 pages are allowed, the block number also being indicated. To change a page number in the list, the function <LIST or LIST> is used to move the cursor left or right through the list. When the cursor is underneath an existing page number, a new page number may be entered from the numeric section of MFNK if required. In this way, a DYNAMIC LST can be set up. With the cursor at position 8 of the first block of 8 pages the next press of LIST> will load the next block of 8 pages into the DYNAMIC DISPLAY. These can then be sequenced as required. The Listing function can be exited with a second press of DYNC LIST. The List is now complete and stands ready for execution.

The DYNAMIC RESET may be executed at any time. By pressing DYNC RESET, the page of switch data under which the cursor is positioned is loaded into the console. A second press of DYNC RESET loads the next page in the sequence into the console, and so on. After the last page in the List has been loaded the next press of DYNC RESET will load the first page of the list again, and so on through the sequence. When the last of the 8 pages in the first block has been selected, the next sequence of 8 pages in the DYNC LIST is automatically loaded.

The current cursor position may be viewed at any time by pressing DYNC LIST; the cursor moves each time DYNC RESET is pressed, thus showing the page currently loaded into the console. The current block number will also be displayed.

A SYNCHRONOUS RESET system extends the concept of DYNAMIC RESET by allowing the pages to be loaded at predetermined SMPTE timecode prompts, i.e., under automatic control. The SYNCHRONOUS RESET system is also comprised of two stages: listing and execution.

To enter into SYNCHRONOUS RESET mode STNC LIST must be pressed. The DYNAMIC LIST DISPLAY is now transformed into the SYNCHRONOUS RESET (list) DISPLAY and the current page of switch data resident in the console along with its associated SMPTE time code position is shown. A typical display would look like:

12 53 32 11 Ø2 Ø9 where 12 indicates hours, 53 indicates minutes, 32 indicates seconds, 11 indicates frames, Ø2 indicates subframes (quarter frames) and Ø9 indicates the page number To enter a new page number and/or time code value the cursor is positioned under the pair of digits to be changed and the new value enter from the numeric keys in MFNK. If the cursor is underneath the page number segment of the display, pressing LIST> indicates the next page and its timecode values. If the cursor is underneath the hours segment of the display and <LIST is pressed, then the previous page and its timecode values will be displayed. A separate display indicates the last number in the list. Once the required sequence of pages and timecode values has been selected, the Listing function can be exited by a second press of SYNC LIST.

SYNCHRONOUS RESET is enabled by pressing the function button labelled SYNC RESET. Only when this is pressed will the Reset system of the console be linked to timecode. Whenever the timecode value currently being read matches a timecode stored in the Synchronous List, the page associated with that timecode value will be loaded into the console automatically. SYNCHRONOUS RESET mode is disenabled with a second press of SYNC RESET.

Note that both DYNAMIC and SYNCHRONOUS REST modes share the same display so that the mode selected automatically toggles the display into the correct format.

A switch grouping system allows any number of switches on any number of channels to be grouped together and toggled between on and off states from one master switch. An example of how this function could be used would be to turn all the auxiliary sends on a group of 8 channels on and off simultaneously. Six INTerrogate buttons are located on the GML subgroup faders. Each one of these INT buttons may be used as a switch group master. Switch Group Mode is comprised of two stages: Setup and Execution.

To enter SETUP mode, the SWITCH GROUP keyswitch on the MAK is pressed. This then puts the computer into a different operational mode, allowing the MCK and RK keyboards to be used to select switches to be toggled and the channel INT buttons to be used to slave channels to the group master. One of the 6 subgroup INT switches is then pressed, and the group number indicated on the Central Display. The INT switches on those channels you intend to slave to the master are then pressed, and these INT switches will be illuminated. Any number of slave channels can be assigned to a master, but overlapping Switch Groups cannot be created. If any channels are already slaved when the switch Group master is pressed, this will be indicated by the illumination of that channel's INT switch. To de-assign a slave channel, the channel INT switch is pressed. If, when creating a new Switch Group, a channel is already slaved to another group, it will be automatically slaved to the new group if the channel INT switch is pressed.

At the same time, the MCK and RK keyboards can be used to select those switches you intend to toggle when the switch group master is pressed. A maximum of 1∅ switches per channel may be selected to the Switch Group in consoles with up to 8∅ channels.

When a Switch Group is used, it can be seen that it may be required to switch some switches in the group ON, and some OFF. Furthermore, some switches will not be required in the group at all. Thus each switch can be in one of 3 states: ON, OFF or OUT (not required). During Switch Group setup, the default condition is NOT REQUIRED. To assign a switch ON, one press is given; OFF requires two presses, and the LED will flash; three presses puts the switch OUT of the group. (Note that a further press would turn the switch ON again, and so forth, in a 3 step cycle).

Once setup is complete, the SWITCH GROUP keyswitch is pressed again to revert the computer to normal operating mode.

The Switch Group may be operated at any time simply by pressing the Switch Group master. The assigned switches on the slave channels will then toggle on-off with each press of the master.

It should be noted that the TOGGLE function is nested inside the SWITCH GROUP function, and that a TOGGLE setup can overlap a SWITCH GROUP. Thus, for example, a Switch Group could include channels 1 to 8, EQ IN and FILTERS IN, and a TOGGLE setup could cover EQ IN for channels 5 to 12. When the Switch Group was activated, both EQ and FILTERS would switch in; when TOGGLE was pressed, EQ would switch out.

A central 300 mm (11.8 inch) chassis section has a minimum of 6 module positions occupied by the central assignement section. Master monitor output and auxiliary send modules are also located in this section.

All channels have a separate horizontal fader section at the front. Various different types of fader units are available, including, as standard, a VCA-fader with digital grouping which may be interfaced to a Audio Kinetics Mastermix computer and a motor-driven fader which is linked to a GML computer. The GML computer is used in an extended interface with the console allowing control of auxiliary send mutes, eq in/out, and filters in/out in real 'SMPTE' time. The extremely powerful capabilities of the GML computer facilitate automated mixing processes through sophisticated on- and off-line editing and merging routines.

Input sensitivity is switch-selectable for microphone inputs in 5dB steps over a range from −70dB to +15dB.

Compared to the operational procedures of a conventional manual console, provision of several layers of software control allow greater integration of standard functions through computer processing.

The operation of a console according to the present invention will now be discussed in detail with reference to FIGS. 4 to 7 compared to the operating procedures of the conventional console, the use of a microprocessor control unit 15 allows a greater flexibility in operation.

Operation of the console principally generates three types of data:

Switch settings:

Rotary Potentiometer settings:

Fader and mute information.

These can all be treated either independently or as combinations to enable the information processing which gives the console its operational power.

SWITCH SETTINGS AND MEMORY LEVELS

Each input channel of the console may have the equivalent of 109 switches (compared to a standard 60 to 70 switches per channel on a conventional electromechanical system) to accommodate the extra busing and functions now provided. Of course standard potentiometers and faders remain on the respective modules. Apart from the great reduction in size which has been achieved by inclusion of the switches in the electronic circuitry, many new possibilities are attained through the manipulation of the memorized switch data.

The switches belonging to each module are mimicked on two of the five keyboards located in the center of the console. These two keyboards are denoted Track and Stereo Assign, and Signal Path Assign.

Using the simplest operational technique available these keyboards are addressed from the individual channel (or module) via the INT ('Interrogation') switch on each module. When INT is pressed the keyboard will display those switch functions already in use. If further changes are to be made, the appropriate keyswitch has simply to be operated.

There are several memory levels available. These are denoted "Live", "Safe", and "Page". These memory levels are protected by long-life battery back-up from accidental erasure through mains power failure.

"Live" is the memory level where all keyswitch information is held. Live is similar to 'Write' mode in fader automation systems, except that the information held, instead of being levels and level changes, is switch on/off information. Effectively, pressing any switch 'overwrites' the preceding switch setup condition for that switch.

"Safe" is a 'read only' memory level where keyswitch operations are disenabled. No changes in switch settings can be made. In order to make a Safe memory, information in Live must be made Safe using an 'Update' key on a Page Assign keyboard. This is done by pressing the keys 'Update' followed by 'Live' followed by 'Safe'. This results in the copying of the whole console switch configuration from the Live into the Safe memory level. Should further switch operations on the Live memory prove to be unsatisfactory, then the Safe memory, acting as a backup, can be reloaded to Live via the keyswitch sequence Update - Safe - Live. On the other hand, if the version in Safe is the final version, it can then be loaded into the Page memory using the sequence Store - Reset - Page (+number).

If the selected Page number is already in use, the information from Safe will be transferred to the next available page number and this will indicated on the status display in the centre of the meter hood.

Page memory level allows storage of multiple Safe and Live memories. It is possible to transfer information directly from Page to Live and vice-versa using the keyswitch sequence Load - Page (number) - Reset - Live (or Store - Reset - Page (number)). Page is in fact a further intermediate memory position. All information in Page can then be loaded to and from floppy or hard disk memory.

The use of the Page system is illustrated diagrammatically in FIGS. 4*a* and 4*b*.

Switch configuration data held in the various memory levels can be edited in various ways through a further function keyboard denoted Module Assign. This is illustrated diagrammatically in FIG. 5.

The functions available, which only occur in the 'Live' memory level and not in the 'Safe' memory level, include:

COPY

This enables the switch configuration of one module to be duplicated on another or more. A satisfactory switch setup can be duplicated to another module by pressing Copy - Int - (channel number, using Memory Assign Keyboard) - Copy.

An Int (Interrogate) switch on the keyboard is a duplicate of the channel INT switch, so either can be used to perform the Copy function. Alternatively the chevron keys < > may be used to step through channels until the required channel is reached. In this case the Copy is enabled through the sequence Copy - Int - <(>) - Copy.

If it is required to Copy from one channel to a group of channels, for example, from 24 to 25 - 48, the key sequence is Copy - Int - 24 - Int - 25 - All - Int - 48 - All. In fact one channel can be copied to the entire console using the All sequence.

Once the copy sequence is complete, the channel being copied from will again be resident in the keyboard.

SWAP

This enables the information on two channels to be swapped from one to the other through the key sequence Int - Swap - Int - Swap. If the Int button on the Module Assign keyboard is used then the channel numbers must be defined on the Memory Assign keyboard.

INSERT

This enables selected switch settings from the interrogated channel to be duplicated to one or more channels. The key sequence here would be Int - Insert - (select keys to be moved on keyboard) - Insert - Int (new channel) - Insert - Int.

When the keys to be inserted are selected, the original memory settings in the "Live" or "Safe" memories are not effected since the keyboard is thrown into a 'demonstration' mode for the purposes of Insert.

Other function switches, which also are only available in the 'Live' memory level, not the 'Safe' memory level, are indicated in FIG. 5.

Four 'default' switch configurations allow instant module setup. These defaults are called 'templates' in that they mimic standard signal paths. The four configurations are:

MIC
MIC REVERSE (effects returns)
MIX
MIX REVERSE (submix)

MIC

In this case, the MAIN signal path selected is Mic amp - Fader - Panpot - Routing to Multitrack. The TRIM signal path selected is (Tape Return) Monitor Mix - Stereo Bus. These paths are indicated in FIG. 6.

To load MIC, the key sequence is Int - Mic.

MIC REVERSE

In this case, the MAIN signal path selected is Line amp - Fader - Panpot - Stereo Bus. The TRIM signal path selected is Auxiliary 1 - Multitrack Routing - selected buses appear at Bus Insert Out on Patchfield.

The typical application for this function is extra auxiliary sends in mixdown allowing mass patching and repatching into external devices under memory control with or without timecode prompts, creating a large audio path events controller.

To load MIC REVERSE, the key sequence is Int - Mic - Rev (or Int - Rev - Mic).

MIX

In this case, the MAIN signal path selected is Mix (Tape) - Fader - Panpot - Stereo. The TRIM signal path selected is MAIN Input (Mic or Line) - Multitrack Routing.

To load MIX, the key sequence is Int - Mix.

MIX REVERSE (submix)

In this case, the MAIN signal path selected is Mix (Tape) - Fader - Panpot - Multitrack Routing. The TRIM signal path selected is Main Input (Mic or Line) - Multitrack Routing.

To load MIX REVERSE, the key sequence is Int - Mix - Rev (or Int - Rev - Mix).

INLAY

This is an optional template which inserts the basic switch setups of MIC and MIX into an already-defined mix set-up. INLAY avoids changing existing auxiliary switch settings. The key sequence would be Int - Inlay - Mic (or Mix, etc. etc).

Each channel fader is equipped with a Remote (REM) switch which can be assigned either (a) one module switch function from the main keyboard or (b) any number of module switch functions from the main keyboard. In addition, the selected soft switch functions may be duplicated over a number of channels. The REM switch can then be used to toggle the selected switches in and out. Furthermore, any number of REM switches can be allocated soft switch functions as described.

An Active Recall system allows the positions of all rotary potentiometers at a given moment to be memorized. This Active Recall information may then be loaded back into the pots from memory using Recall display bars on a longitudinal display panel disposed towards the rear of the console chassis.

The Recall system is active at all times and may be used independently of other console operations. There is no need to stop work to store or load Active Recall pictures.

To save rotary settings the key sequence is Store - Recall. The information is then placed in its own separate memory. If it is required to store several different pictures then the information is saved to a Page number using the sequence Store - Recall - (number).

Independently a Reset switch configuration may also be stored under the same page number giving a complete Reset-Recall combination. Thus Reset and Recall can be combined or separated according to requirements.

Active Recall information may ultimately be loaded to floppy/hard disk.

Recall information is reloaded using the sequence Load - Recall - (page number). Information relevant to each potentiometer is addressed using the Recall keyboard, which is comprises of 32 switches covering all module potentiometers including those on the optional Dynamics section.

To load High Frequency boost/cut settings, for example, the switch labelled HFB is pressed. A green LED on the display panel will illuminate and the Recall display bars will show memory and current positions of all HF boost/cut pots. The HF boost/cut pots are then turned until the memory and current LED displays are aligned, indicating that pot position equals memory setting.

DYNAMIC RESET

As previously mentioned, both Live and Safe memories can be addressed from the Memory Assign Keyboard. For example, Page 01 could be loaded to "Live" and Page 02, to "Safe" using key sequences Load - Reset - 01 - Live; Load - Reset - 02 - Safe.

SYNCHRONOUS RESET

This involves the automatic timecode-prompted loading of Page numbers to the Safe memory only. The Safe memory is then automatically loaded to the switches and the console reconfigured appropriately. Any number of pages can be sequenced for continuous loading.

The Live memory is active during Synchronous Reset but is automatically overridden as the Page is loaded into Safe. Once this has occurred, however, it is possible to flip back to Live instigating yet another console setup. This system can be used for rehearsing a possible setup addition with a view to inclusion in the sequence.

Comprehensive displays are provided as a guide to operational status. The displays can be divided into four main areas:

RECALL SYSTEM
CENTRAL KEYBOARD
CHANNEL STATUS DISPLAY
KEYSWITCH COMPARISON DISPLAY

RECALL SYSTEM

As mentioned above, Recall information is loaded using two 20-segment LED bars located directly behind each module in the lower section of the screen. When Dynamics are fitted, the LED bars also function as additional meters, one showing Gain Reduction and the other channel pre-insert level. Selection of Recall functions automatically overrides the meter function.

CENTRAL KEYBOARD AND KEYSWITCH COMPARISON DISPLAY

In both Live and Safe mode the keyboard displays the resident memory as selected via the INT key using a red LED in each keyswitch. When a key is pressed - for example Track Assign 1 - all the modules assigned to that bus are automatically indicated by the illumination of a large horizontal green LED 50 (see FIG. 2*d*) situated immediately beneath the LED rows 45, 46 of the display of each module. This provides a general cross-reference and may prevent misrouting errors.

During COPY and SWAP routines the green LEDs cycle across the console to indicate that the function is being executed.

CHANNEL STATUS DISPLAY

This is comprised of module number —for example, CH07 would shown when channel 7 is interrogated —and indicates Live or Safe and from which memory the data is being drawn.

The two signal paths for that module —MAIN and TRIM— are also displayed. For example, MAIN could be comprised of whichever of MIC; LINE; MIX; LINE IN; LINE OUT; MULTITRACK; STEREO and PAN are being used. Thus the engineer can quickly appraise the state of his two signal paths.

The contents of these displays are held in the memory for each module and are automatically loaded/updated when that module is called.

On interrogating a module the keys associated with the module assign keyboard, namely MIC, MIX, REV and INLAY should show the last state/ the last command used by them as an indication/display.

A signal path keyboard allows configuration of all channel routing including input and output selection; auxiliary assign; and dynamics switching. The functions covered are as follows (by switch):

MAIN: this signal path contains the main fader.
MIC/LINE selects either mic or line input amplifiers.
MIX selects the Tape Return signal used for mixdown.
DESK A/B
INSERT PRE/post eq
INSERT IN/out
PHANTOM POWER on/off
PHASE REVERSE (both mic and line inputs)
HIGH and LOW PASS filters in/out (also controlled by switch 38)
EQUALIZER in/out (also controlled by switch 39)
HF and LF bell/shelf characteristics
TRIM: this signal path contains the TRIM pot 41 located above the Panpot 42.
MAIN INPUT takes Mic/line as selected by the Mic or Line switch on the MAIN signal path. In other words, Mic can be selected to both MAIN and TRIM paths at the same time.
MIX is the Tape Return (normally referred to as input to monitor mix)
BUS/TAPE is the Desk Output/Tape Return.
AUX takes the input to Auxiliary 1 (which can be pre or post MAIN fader).
MIX BUS (patch trim): selected buses appear at Bus Insert Out on Patchfield. (See above Template).
OUTPUT ASSIGN: Both signal paths can be routed to the same selection of outputs.
TRIM TO STEREO toggles the outputs of TRIM or MAIN paths to the stereo assign routing.
TRIM TO BUS toggles the outputs of TRIM or MAIN paths to the multitrack assign routing.
PAN IN TO STEREO selects the panpot to the front of the stereo assign routing.
PAN IN TO BUS selects the panpot to the front of the multitrack assign routing.
TRIM TO PATCH assigns the output of the Trim pot to the selected multitrack bus output patchpoints on the jackfield. (See above MIC REVERSE).
AUX: There are 8 auxiliary outputs configured as 4 mono and 2 stereo which can take their input from either MAIN or TRIM paths pre or post. On the module are 4 Mute buttons, one per pair of auxiliary outputs. These Mute buttons can be assigned to mute either output of each pair or both.

PRE 1 - 2 - 3 - 4: default setting for auxiliary sends is POST fader. This enables auxiliaries to be switched PRE fader.

TRIM 1 - 2 - 3 - 4: auxiliary sends sourced from TRIM: 1 and 2 are pre-TRIM, whilst 3 and 4 are post TRIM.

The procedure for pre-session setup of the console is indicated diagrammatically in FIG. 7 and this will be readily understood by those skilled in the art.

With the console of the invention it is possible to pre-define a console set-up configuration for later operational use. Complicated overdubs —for example orchestral— can be thought about and designed in advance of the normal studio setup time. The memory system can also be used as an engineer's personalized operating technique with his particular configuration requirements held in memory until required.

What is claimed is:

1. An audio production console, comprising:

a plurality of inputs;

at least one output bus;

a plurality of separate identical input modules, each of said input modules being connected between a corresponding one of said inputs and said at least one output bus, each of said input modules comprising a plurality of circuit means and a plurality of switching means, said plurality of circuit means and said plurality of switching means being interconnected so as to define a plurality of potential signal paths with the corresponding input module between said plurality of circuit means for a signal from a corresponding one of said inputs, each of said plurality of circuit means being for modifying the audio characteristics of an audio signal from said corresponding input; and a common control means for all of said plurality of input modules, which control means controls said switching means so as to select at least one of said plurality of potential signal paths as at least one actual signal path of said audio signal from said corresponding input.

2. A console according to claim 1, wherein predetermined ones of said circuit means of each input module includes adjustment means for varying the function carried out on a signal from the corresponding input.

3. A console according to claim 2, wherein the control means includes a memory for storing information corresponding to a selected position of the adjustment means of each predetermined circuit means of each input module.

4. A console according to claim 3, having a module display adjacent each input module, and means for comparing the adjustment of said adjustment means of a predetermined circuit means of the adjacent input module with said selected position stored as corresponding information in the memory, the module display displaying when the adjustment means of said predetermined circuit means of the adjacent input module corresponds to the selected position stored as corresponding information in the memory.

5. A console according to claim 1, wherein the output bus has a plurality of bus lines, and the control means is for selectively connecting each input module to selected ones of the bus lines.

6. A console according to claim 1 having additional modules between the input and the input module and which additional modules contain circuit means for carrying out a function on a signal, which circuit means are controlled by the control means.

7. A console according to claim 1 having additional modules between the input module and the output bus, which additional modules contain circuit means for carrying out a function on a signal, which circuit means are controlled by the control means.

8. An audio production console, comprising:

a plurality of inputs;

at least one output bus;

a plurality of separate identical input modules, each of said input modules being connected between a corresponding one of said inputs and said at least one output bus to define a signal path for a signal from the corresponding input, each of said plurality of input modules having a plurality of circuit means, each of said plurality of circuit means being for modifying the audio characteristics of an audio signal on said signal path from the corresponding input, and predetermined ones of said plurality of circuit means include adjustment means for varying said function carried out on said signal on said signal path;

a common control means for all of said input modules, said common control means including a memory for storing information relating to a selected position of said adjustment means of said predetermined ones of said plurality of circuit means of each of said plurality of input module, said control means selecting one of said predetermined ones of said plurality of circuit means of each of said plurality of input modules; and a module display adjacent each of said plurality of input modules, and means for comparing the adjustment of said adjustment means of a predetermined circuit means of the adjacent input module with said selected position stored as corresponding information in the memory, each module display being controlled by said control means in dependence on the selection of said predetermined ones of said circuit means, each of said module displays being for displaying when said adjustment means of said selected one of said predetermined ones of said plurality of circuit means of the corresponding input module corresponds to said selected position stored as said information in said memory of said control means.

9. A console according to claim 8, wherein each module display has two adjacent display tracks, one of those tracks displaying an indication of the selected position of the adjustment means of the corresponding module stored as corresponding information in the memory and the other track displaying the actual position of the adjustment means of the corresponding module.

10. A console according to claim 8, wherein the memory is for storing a plurality of selected positions of the adjustment means.

11. A console according to claim 8, wherein the control means has a control display for displaying the information stored in the memory.

12. A console according to claim 11, wherein each input module has means for causing the control display to display information relating to that module stored in the memory.

* * * * *